(12) United States Patent
de Jong et al.

(10) Patent No.: US 8,846,832 B2
(45) Date of Patent: Sep. 30, 2014

(54) STORAGE STABLE AND SAFE PEROXIDE EMULSIONS WITH A HIGH ACTIVE OXYGEN CONTENT

(75) Inventors: Johannes Jacobus Theodorus de Jong, Westervoort (NL); Johan Nuysink, Rijssen (NL); Koen Antoon Kornelis Vanduffel, Deventer (NL); Petrus Paulus Waanders, Goor (NL)

(73) Assignee: Akzo Nobel Chemicals International B.V., Amersfoort (NL)

( * ) Notice: Subject to any disclaimer, the term of this patent is extended or adjusted under 35 U.S.C. 154(b) by 257 days.

(21) Appl. No.: 13/388,834

(22) PCT Filed: Aug. 3, 2010

(86) PCT No.: PCT/EP2010/061251
§ 371 (c)(1),
(2), (4) Date: Apr. 4, 2012

(87) PCT Pub. No.: WO2011/015567
PCT Pub. Date: Feb. 10, 2011

(65) Prior Publication Data
US 2012/0184691 A1 Jul. 19, 2012

Related U.S. Application Data

(60) Provisional application No. 61/244,571, filed on Sep. 22, 2009.

(30) Foreign Application Priority Data

Aug. 6, 2009 (EP) ..................................... 09167351

(51) Int. Cl.
C08F 2/32 (2006.01)
C08F 14/06 (2006.01)
C09K 3/00 (2006.01)

(52) U.S. Cl.
USPC .... 526/81; 526/227; 252/186.42; 252/186.26

(58) Field of Classification Search
USPC .................. 526/81, 227; 252/186.42, 168.26
See application file for complete search history.

(56) References Cited

U.S. PATENT DOCUMENTS 3,988,261 A 10/1976 Barter et al.
7,087,693 B2 * 8/2006 Tammer et al. ................ 526/231

FOREIGN PATENT DOCUMENTS

| EP | 0 032 757 A3 | 7/1981 |
| JP | 04-293904 A | 10/1992 |
| JP | 11-171914 A | 6/1999 |
| WO | WO 99/05101 A1 | 2/1999 |
| WO | WO 99/31194 A1 | 6/1999 |
| WO | WO 00/17245 A1 | 3/2000 |
| WO | WO 03/054039 A1 | 7/2003 |
| WO | WO 03/054040 A1 | 7/2003 |
| WO | WO 03/087168 A1 | 10/2003 |
| WO | WO 03/095500 A1 | 11/2003 |
| WO | WO 2004/096871 A1 | 11/2004 |
| WO | WO 2004/113392 A1 | 12/2004 |
| WO | WO 2005/000916 A1 | 1/2005 |
| WO | WO 2007/012595 A1 | 2/2007 |

OTHER PUBLICATIONS

European Search Report dated Jan. 22, 2010 for Application No. EP 09 16 7351.
International Search Report with Written Opinion dated Feb. 8, 2011 for International Application No. PCT/EP2010/061251.
English translation of Chinese office action dated Mar. 7, 2013 for Chinese Application No. 201080034777.
Third Party Observation for Japanese Patent Application No. 2012-523315 dated Jun. 14, 2013.
English translation of Third Party Observation for Japanese Patent Application No. 2012-523315 dated Jun. 14, 2013.
English translation of JP 04-293904 A published Oct. 19, 1992.

* cited by examiner

*Primary Examiner* — Robert D. Harlan
(74) *Attorney, Agent, or Firm* — Robert C. Morriss

(57) ABSTRACT

Emulsion comprising an oil phase dispersed in an aqueous phase, wherein said oil phase comprises at least 53 wt % of one or more organic peroxides, more than 50 wt % of which have a molecular active oxygen content of at least 7.00 5 wt %, said emulsion satisfying the classification tests for organic peroxide type F. This emulsion allows the safe transport and storage of organic peroxide emulsions with high active oxygen content without the need for larger vent openings or higher design pressure of transport tanks and storage tanks.

12 Claims, No Drawings

STORAGE STABLE AND SAFE PEROXIDE EMULSIONS WITH A HIGH ACTIVE OXYGEN CONTENT

The present invention relates to storage stable and safe emulsion comprising one or more organic peroxides, said emulsion having a high active oxygen content. The invention further relates to the use of such emulsions in polymerization reactions.

Aqueous emulsions of organic peroxides containing relatively high concentrations of organic peroxide are known from the prior art. Examples of such prior art documents are EP 0 032 757, WO 99/005101, U.S. Pat. No. 3,988,261, and WO 2003/095500.

The emulsions that are exemplified in these documents all contain an oil phase consisting exclusively of organic peroxide with relatively low molecular active oxygen content; that is: less than 7.00 wt %. And although these documents suggest various other organic peroxides as suitable for preparing stable emulsions, including peroxides with a higher molecular active oxygen content, such emulsions seem not to have been actually prepared and certainly not tested for safety according to UN regulations.

The problem associated with emulsions comprising peroxides with a molecular active oxygen content of about 7.00 wt % or higher, is the increased danger associated with thermal runaway. Therefore, emulsions containing a peroxide with a high molecular active oxygen content generally need a phlegmatizer to fulfill the UN transport classification requirements. The purpose of this phlegmatizer is to increase the thermal stability and to reduce the effects of a thermal runaway, if it occurs. Typical phlegmatizers are essentially water-insoluble solvents like isododecane and odorless mineral spirits (OMS).

For instance, the present commercial emulsions of diisobutyryl peroxide, which has a molecular active oxygen content of 9.18 wt %, do not contain more than 26 wt % of peroxide. The oil phase contains the solvent isododecane in an amount of 1 kg per kg diisobutyryl peroxide. This emulsion is classified as type F liquid (according to classification principles as described in the recommendations by the United Nations Committee of Experts on the Transport of Dangerous Goods), which means that it is allowed to be stored and transported in relatively large transport containers and storage tanks, providing certain requirements on geometry. These requirements include the diameter of emergency vent openings and design pressure of the tank itself. Given a tank that only just fulfils these requirements for a certain peroxide formulation, that tank would generally not fulfill requirements needed to store and/or transport a more concentrated formulation of the same peroxide. The reason is that the heat development and, therefore, the pressure effects will generally scale-up with the concentration and amount of peroxide in the tank.

The use of more concentrated emulsions is nevertheless desired, for example to improve economics of storage and transport.

Surprisingly, and contrary to expectations, it has now been found that for emulsions of organic peroxides with a relatively high molecular active oxygen content, the safety characteristics of the emulsion can be improved when replacing part of the phlegmatizer by organic peroxide. This allows the safe transport and storage of organic peroxide emulsions with high active oxygen content without the need for larger vent openings or higher design pressure of transport tanks and storage tanks.

The present invention therefore relates to an emulsion comprising an oil phase dispersed in an aqueous phase, wherein said oil phase comprises at least 53 wt % of one or more organic peroxides, more than 50 wt % of which have a molecular active oxygen content of at least 7.00 wt %, said emulsion satisfying the classification tests for organic peroxide type F.

The Oil Phase

The oil phase of the emulsion according to the present invention comprises at least 53 wt %, preferably at least 55 wt %, more preferably at least 60 wt %, and most preferably at least 68 wt % of one or more organic peroxides, more than 50 wt % of which have a molecular active oxygen content of at least 7.00 wt %. The content of organic peroxide in the oil phase is preferably not more than 85 wt % and most preferably not more than 77 wt %, which allows for preferably at least 15 wt %, most preferably 23 wt % of other components in the oil phase. The other components preferably are components with a molecular active oxygen content of less than 1 wt %. Preferred other components are phlegmatizers, i.e.

organic solvents satisfying the United Nations Recommendations on the Transport of Dangerous Goods, which preferably do not dissolve in water for more than 1 vol %. Examples of suitable phlegmatizers are isododecane, odorless mineral spirits (OMS), white spirit type aliphatic solvents, and solvents that are used as plasticizers in PVC (e.g. adipates like diisodecyladipate). The phlegmatizer content of the oil phase is preferably at least 15 wt %, more preferably at least 23 wt %. The phlegmatizer content of the oil phase is less than 47%, more preferably less than 45%, yet more preferably less than 40%, and most preferably less than 32%.

The majority, that is: more than 50 wt %, of the organic peroxides that are present in the oil phase have a molecular active oxygen content of at least 7.00 wt %, preferably at least 8.00 wt %, yet most preferably at least 9.00 wt %. The molecular active oxygen content of the majority of the organic peroxides in the oil phase (more than 50 wt %) is preferably less than 15 wt %, most preferably less than 12 wt %.

In a preferred embodiment, more than 60 wt %, more preferably more than 70 wt %, even more preferably more than 80 wt %, yet more preferably more than 90 wt %, and most preferably 100 wt % of the organic peroxides present in the oil phase have a molecular active oxygen content of at least 7.00 wt %.

This molecular active oxygen content is defined as the wt % of active oxygen atoms (one oxygen atom per peroxide functionality) based on the weight of the molecule. In other words, the molecular active oxygen content can be calculated as 16p/Mw, wherein p is the number of peroxide (—O—O—) functionalities in the molecule and Mw is the molecular weight of the molecule. The active oxygen content of the emulsion then follows from the molecular active oxygen content of the peroxide and its concentration in the emulsion.

Examples of organic peroxides with a molecular active oxygen content (AO) of at least 7.00 wt % are diisobutyryl peroxide (AO=9.18 wt %), 1-(2-ethylhexanoylperoxy)-1,3-dimethylbutyl peroxypivalate (AO=8.88 wt %), tert-butyl peroxyneoheptanoate (AO=7.91 wt %), tert-amyl peroxypivalate (AO=8.50 wt %), tert-butyl peroxypivalate (AO=9.18 wt %), 2,5-dimethyl-2,5-di(2-ethylhexanoylperoxy)hexane (AO=7.43), tert-butyl peroxydiethylacetate (AO=8.50 wt %), tert-butyl peroxyisobutyrate (AO=9.99 wt %), 1,1-di-tert-butylperoxy)-3,3,5-trimethylcyclohexane (AO=10.58 wt %), 1,1-di(tert-butylperoxy)cyclohexane (AO=12.29 wt %), 2,2-di(tert-butylperoxy)butane (AO=13.66 wt %), tert-butylperoxy isopropyl carbonate (AO=9.08 wt %), diethylperoxydicarbonate (AO=8.98 wt %), tert-butyl peroxyacetate (AO=12.11 wt %), tert-butylperoxybenzoate (AO=8.24 wt %), di-tert-amyl peroxide (AO=9.18 wt %), 2,2-dimethyl-2,5-di(tert-butylperoxy)hexane (AO=11.02 wt %), tert-butyl cumyl peroxide (AO=7.68 wt %), and 2,2-dimethyl-2,5-di(tert-butylperoxy)hexyne-3 (AO=11.17 wt %).

Preferably, the water-solubility of the organic peroxide is less than 1 vol % at +5° C. The organic peroxide is preferably a liquid at 0° C. The organic peroxide preferably has a half life in monochlorobenzene of less than 1 hr at 70° C.

The preferred organic peroxide that is present in the oil phase is diisobutyryl peroxide. More preferably, this peroxide makes up more than 50 wt %, more preferably at least 75 wt %, even more preferably at least 90 wt %, and most preferably at least 95 wt % of the total amount of organic peroxide that is present in the emulsion of the present invention.

The Aqueous Phase

The aqueous phase preferably comprises at least 50 wt % water.

Other components that may be present in the aqueous phase are the usual additives that stabilize emulsions and prevent the emulsion from freezing. Preferably, the aqueous phase will not freeze at temperatures above −10° C., more preferably −20° C., most preferably −25° C.

Examples of such other compounds are protective colloids, surfactants, anti-freeze agents, and thickeners.

Examples of suitable protective colloids are celluloses and partially hydrolyzed polyvinyl acetate. Partially hydrolyzed polyvinyl acetate (PVA) is the preferred protective colloid to be present in the aqueous phase. Preferably, the PVA has a degree of hydrolysis of at least 45%, more preferably at least 48%, and most preferably at least 50%, and preferably at most 80%, more preferably at most 70%. Preferably, the PVA is randomly hydrolyzed, as opposed to blocky hydrolyzed.

Instead of using just one type of PVA, also a blend of two or more PVA's can be used. In that case the blend can be seen as just one PVA of which the degree of hydrolysis is the weight average degree of hydrolysis of the PVA's. Preferably, such a blend of PVA's does not comprise more than 0.2% of a PVA with a degree of hydrolysis below 45% or above 80%.

The amount of PVA used in the emulsions according to the invention will depend on the concentration and the types of peroxides and surfactants used and the desired viscosity of the final emulsion. Typically, the amount of PVA in the final emulsion will be at least 0.01 wt %, preferably at least 0.1 wt %, and most preferably at least 0.5 wt %, and at most 5% wt %, more preferably at most 3.0 wt %, even more preferably at most 2.5 wt %, more preferably at most 2.0 wt %, and most preferably at most 1.5 wt %.

Surfactants are surface-active chemicals that influence the interfacial surface tension between the aqueous phase and the oil phase. Such compounds are also known as "emulsifiers." Preferably, the emulsion according to the invention contains a surfactant with an HLB value of 15 or higher. More preferred are surfactants with an HLB value of at least 16, and most preferred are surfactants with an HLB value of at least 17. If so desired, a mixture of surfactants may be used. The HLB value stands for the hydrophilic-lipophilic balance, as described in "The Atlas HLB-System, a time saving guide to emulsifier selection," published by Atlas Chemical Industries Inc., 1963.

Examples of surfactants that can be used in the aqueous phase are alkylene oxide block-copolymers, ethoxylated fatty alcohols, and ethoxylated fatty acids. The preferred surfactants are ethoxylated fatty alcohols and ethoxylated fatty acids with an HLB value greater than 15. Most preferred are such ethoxylated fatty alcohols. Examples of suitable ethoxylated fatty alcohols include ethoxylated lauryl alcohol, e.g., with a degree of ethoxylation of 23, having an HLB-value of 16.9, and obtainable from ICI as Brij® 35, ethoxylated dodecyl alcohol, such as Remcopal® 20, ethoxylated myristyl alcohol, ethoxylated cetyl alcohol, ethoxylated oleyl alcohol, ethoxylated mixtures of alcohols, such as Ethylan® CO35, which is the ethoxylated product of a mixture of palmitic alcohol and oleyl alcohol, ethoxylated alcohols derived from coconut oil, palmitic acid, and/or tallow, and ethoxylated stearyl alcohol, e.g., with a degree of ethoxylation of 80 with an HLB-value of 18.5, and obtainable from Akzo Nobel as Berol® 08.

Preferably the amount surfactant is below 1.0 wt %.

Suitable anti-freeze agents are methanol, ethanol, propanol, isopropanol, glycol, propanediol, and glycerol, since it is known that such compounds will have hardly any effect on polymerization processes in which peroxide emulsions are used. Most preferably, methanol is used as anti-freeze. Also combinations of two or more anti-freeze agents can be used in the emulsion according to the invention. If, for example, ethylene glycol is added in a relatively low amount to a mixture of water and methanol, the flammability will be positively influenced, as the total mixture will be less flammable at the same temperature.

The amount of anti-freeze is preferably chosen such that the emulsion does not freeze at a temperature of −10° C. More preferably, the emulsion does not freeze at a temperature of −15° C., most preferably the emulsion does not freeze at a temperature of −20° C.

Thickeners can be present in a concentration preferably not exceeding 2 wt %, preferably less than 1 wt % most preferably less than 0.3 wt % (based on the weight of the emulsion) in order to control the viscosity of the composition. Non-limiting examples of thickeners useful in the formulation are xanthan gum, Arabic gum, and alginates. However, thickeners are preferably omitted from the emulsion.

A small amount, preferably less than 2 wt % more preferably less than 1 wt % of one or more organic peroxides can be present in the aqueous phase.

Other additives that may be present in the aqueous phase are pH-adjusting agents such as calcium oxide or phosphate buffers, sequestering agents, and, if desired, biocides, e.g. fungicides. The concentration of these additives will depend on the desired effect and the other ingredients in the emulsion.

The Emulsion

The emulsion according to the present invention is an oil-in-water emulsion. It can be prepared in any conventional way of preparing such emulsions.

The emulsion preferably contains 35-75 vol %, more preferably 45-70 vol %, and most preferably 50-65 vol % of oil phase, the remainder—up to 100 vol %—being aqueous phase.

Preferably, the active oxygen content of the emulsion is at least 2.60 wt %, more preferably at least 3.10 wt %, and most preferably at least 3.50 wt % Preferably, the active oxygen content of the emulsion is below 4.60 wt %, most preferably below 4.20 wt %.

The emulsion according to the present invention preferably has a Self-Accelerating Decomposition Temperature (SADT) below +20° C., more preferably below +10° C. and most preferably below +5° C. for a packaging size of 50 kg. The SADT is the lowest temperature at which self-accelerating decomposition may occur with a packaged substance and is measured according to UN test H.4.

The emulsion must satisfy the classification tests for "organic peroxide Type F", of the Manual of Tests and Criteria ($4^{th}$ revised edition), Part II, Division 5.2 of United Nations Recommendations on the Transport of Dangerous Goods, resulting in a classification UN 3109 and/or UN 3119.

Applications of the Emulsion

The emulsion according to the present invention finds use in polymerization reactions of, e.g., ethylenically unsaturated monomers, for example vinyl chloride monomer.

In particular, it is very suitable for use in a process for the suspension polymerization of one or more ethylenically unsaturated monomers, e.g. vinyl chloride monomer, involving the step of continuously and/or intermittently dosing the emulsion according to any one of the preceding claims to the polymerization reactor at the polymerization temperature. Such processes are described in WO 2000/017245, WO 2003/054040, WO 2003/087168, WO 2003/054039, WO 2004/096871, WO 2004/113392, and WO 2005/000916.

EXAMPLES

Emulsion Preparation

In the examples below, emulsions were prepared by adding the oil phase to the aqueous phase and using an Ultra Turrax for the emulsification. A cooling shell was used to keep the temperature between −10° and 0° C. If needed to remain within this temperature range, the Ultra Turrax action was temporally discontinued.

The aqueous phase in the examples below was prepared by mixing the ingredients at room temperature in a glass beaker equipped with a laboratory stirrer, allowing 1 hour stirring time after adding the PVA and other dispersion agents to the water/methanol mixture.

Example 1

An emulsion was prepared according to the procedure above. The oil- and aqueous phases had the following composition:
Oil Phase:
72 wt % di-isobutyryl peroxide in isododecane
Aqueous Phase:
PVA, 62-68% hydrolyzed under acid conditions (blocky hydrolyzed): 1.1 wt % of final emulsion
Ethoxylated stearyl alcohol (HLB=18.5): 0.3 wt % of final emulsion
Methanol/water mixture (weight ratio: 32/68) up to 100 wt % of the aqueous phase.

The peroxide content of the final emulsion was 40 wt %; the active oxygen content of the emulsion was 3.67 wt %.

The stability of the emulsion was determined by measuring the droplet size in time, using light scattering (Malvern® Easy Sizer). It turned out that the emulsion was very stable. 99% of the dispersed phase volume was well below 10 micron and remained as such for at least three months when stored between −25° C. and −20° C.

In a separation test with 150 ml emulsion, kept at 35° C. (at which the peroxide decomposes relatively fast), the product separated in a transparent upper layer of 36% of the liquid height and a lower white (emulsion) layer of 64% of the liquid height. The active oxygen concentration in the upper layer was below 1 wt %.

Because the peroxide-containing oil phase remained dispersed in the water phase, the peroxide will decompose in close proximity of water phase. The decomposition heat will thus initially be used to heat up and evaporate the water phase. The temperature will therefore not exceed the boiling temperature of the water phase and remain very moderate. This will ensure a runaway that does not develop into a thermal explosion with hazardous effects. In other words: the emulsion remains relatively stable even under these runaway conditions.

A large scale run-away test with 10 kg of this emulsion under non-stirred conditions to simulate fire engulfment of a large storage tank confirmed the safe runaway behaviour. That test was performed with 8.675 kg of the emulsion in a 9.64 liter vessel with a vent size of 13 mm in diameter. The vent opening was equipped with a 1 barg bursting disk (aluminium disk with a 1 mm whole). Applied heating rate was 0.5° C./min. During the run away the disk burst at 1.1 bar and there was no secondary pressure effect.

Example 2

Example 1 was repeated, except that randomly hydrolyzed PVA was used. The resulting emulsion was very stable and 99% of the dispersed phase volume was well below 10 micron and remained as such for at least three months when stored between −25° C. and −20° C.

In a separation test with 150 ml emulsion, kept at 35° C., no separation occurred, not even after 8 hr at increased temperature. It can be concluded that the emulsion remains fully stable, even under these runaway conditions.

A large scale run-away test performed as described in example 1 confirmed the safe runaway behaviour with no secondary pressure effect.

Comparative Example A

Example 2 was repeated, except that the oil phase contained 48 wt % of di-isobutyryl peroxide, resulting in a peroxide concentration in the final emulsion of 26 wt % and an active oxygen content of the final emulsion of 2.39 wt %.

The resulting emulsion was very stable and 99% of the dispersed phase volume was well below 10 micron.

A large scale run-away test performed as described in example 1 but with different vent sizes (size of the rupture disk) resulted in a secondary pressure effect after rupture of the disk. Used disks in two different experiments were 9 and 14 mm and the secondary pressure effect was as high as 12.9 bar for the 9 mm disk and 4.1 bar for the 14 mm disk. A storage tank with the same A/V (ratio between vent opening and tank-size) can be designed to withstand the secondary pressure effect of 4.1 bar, but it is clear that the emulsion from this example does put higher requirements to the storage tank.

The invention claimed is:

1. Emulsion comprising an oil phase dispersed in an aqueous phase, wherein said oil phase comprises at least 53 wt % of one or more organic peroxides, more than 50 wt % of which is diisobutyryl peroxide, said emulsion satisfying the classification tests for organic peroxide type F, and wherein the emulsion has an active oxygen content of at least 2.60 wt. %

2. Emulsion according to claim 1 wherein the active oxygen content of the emulsion is in the range from 2.60 to 4.60 wt %.

3. Emulsion according to claim 1 wherein the oil phase comprises at least 55 wt % of one or more organic peroxides.

4. Emulsion according to claim 1 wherein the aqueous phase comprises at least 50 wt % water.

5. Emulsion according to claim 1 wherein the aqueous phase comprises one or more anti-freeze agents.

6. Process for the suspension polymerization of one or more ethylenically unsaturated monomers involving the step of continuously and/or intermittently dosing the emulsion according to claim 1 to a polymerization reactor at the polymerization temperature.

7. Process according to claim 6 wherein at least one of the ethylenically unsaturated monomers is vinyl chloride monomer.

8. Emulsion according to claim 1 wherein the active oxygen content of the emulsion is at least 3.10 wt %.

9. Emulsion according to claim 1 wherein the active oxygen content of the emulsion is at least 3.5 wt %.

10. Emulsion according to claim 1 wherein the active oxygen content of the emulsion is in the range from 2.60 to 4.20 wt %.

11. Emulsion according to claim 1 wherein the oil phase comprises at least 60 wt % of one or more organic peroxides.

12. Emulsion according to claim 1 wherein the oil phase comprises at least 68 wt % of one or more organic peroxides.

\* \* \* \* \*